United States Patent

Kobayashi et al.

Patent Number: 5,225,639
Date of Patent: Jul. 6, 1993

[54] LOUDSPEAKER

[75] Inventors: Hiroyuki Kobayashi; Takeshi Tokusyo; Tomiaki Ando, all of Yamagata, Japan

[73] Assignee: Pioneer Electronic Corporation, Tokyo, Japan

[21] Appl. No.: 709,526

[22] Filed: Jun. 3, 1991

[30] Foreign Application Priority Data

Oct. 17, 1990 [JP] Japan .................................. 2-278733

[51] Int. Cl.⁵ .......................... H05K 5/00; H04R 25/00
[52] U.S. Cl. ..................................... 181/151; 181/155; 381/160
[58] Field of Search ............... 181/141, 155, 156, 151, 181/153, 154; 381/86, 160, 205, 188

[56] References Cited

U.S. PATENT DOCUMENTS

| 1,786,279 | 12/1930 | Wolff | 181/155 |
| 2,643,727 | 6/1953 | Leon | 181/155 |
| 3,059,720 | 10/1962 | Matsuoka | 181/155 |
| 5,031,220 | 7/1991 | Takagi et al. | 181/155 X |

Primary Examiner—Michael L. Gellner
Assistant Examiner—Khanh Dang
Attorney, Agent, or Firm—Nikaido, Marmelstein, Murray & Oram

[57] ABSTRACT

A loudspeaker has a magnetic circuit and a speaker frame attached to the magnetic circuit, which is mounted on a rear tray of an automobile. A grille is attached to the speaker frame so as to reflect sound generated from the magnetic circuit. The grille has a slit so as to radiate the sound in a forward horizontal direction.

3 Claims, 6 Drawing Sheets

LOUDSPEAKER

BACKGROUND OF THE INVENTION

The present invention relates to a loudspeaker installed in an automobile.

Mounting restrictions of automotive interior impose various limits on the installation of a car speaker. In other words, problems peculiar to the car speakers but not to home speakers arise. One of these problems is that a dip caused by reflected sound appears in the frequency response of the speaker.

Referring to FIG. 10, a conventional loudspeaker has a magnetic circuit 1 and a speaker frame 2, an opening of which is covered with a net 4 through a grille 3. The speaker is mounted on a rear tray 6 behind a rear seat 5 so that the axis of the speaker is set in the vertical direction. As a result, the opening of the speaker frame 2 faces a rear window 7. Sound from the speaker is propagated through the interior space of the automobile to a listener 8.

In the conventional speaker, the sound which is transmitted to the listener 8 comprises a directly propagating sound $\gamma$ and a reflected sound $(\beta+\alpha)$. There is a difference of time $(\alpha+\beta-\gamma)/c$ (c is the speed of sound between the direct sound $\gamma$ and the reflected sound $(\beta+\alpha)$. Therefore, a dip appears near 500 Hz in the frequency response shown in FIG. 11. The dip prevents a clear sound reproduction.

SUMMARY OF THE INVENTION

The object of the present invention is to provide a loudspeaker which reproduces clear sound.

According to the present invention there is provided a loudspeaker having a speaker unit and a horn attached to the magnetic circuit, and mounted on a rear tray of an automobile, setting an axis of the loudspeaker vertically, comprising a grille attached to the speaker frame so as to reflect sound generated from the magnetic circuit, the grille having a slit so as to radiate the sound in a forward direction.

In one aspect of the invention, a sound absorbent is provided in the grille so as to absorb sound propagating in a rearward direction, and a horizontal panel is provided in the grille to define an upper chamber in the grille.

The other objects and features of this invention will become understood from the following description with reference to the accompanying drawings.

DETAILED DESCRIPTION OF THE PREFERRED EMBODIMENTS

Figure 1:
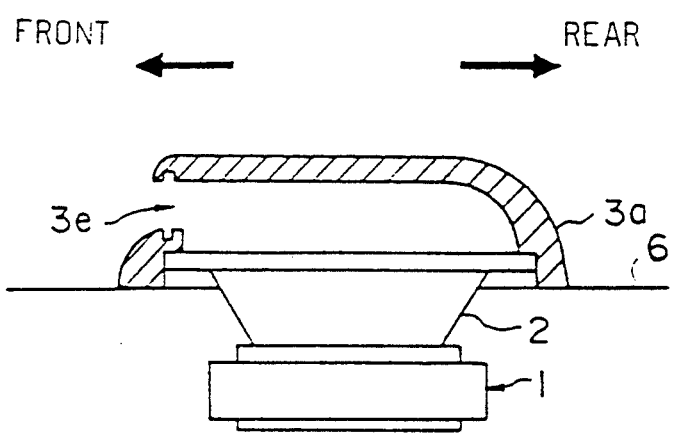
FIG. 1 is a sectional view of a loudspeaker according to the present invention.
Figure 2:
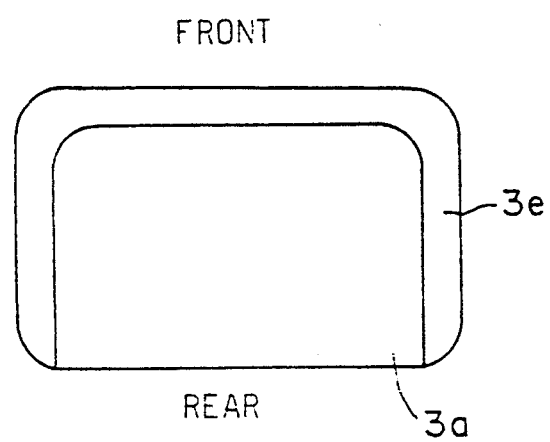
FIG. 2 is a plan view of the loudspeaker of FIG. 1.
Figure 10:
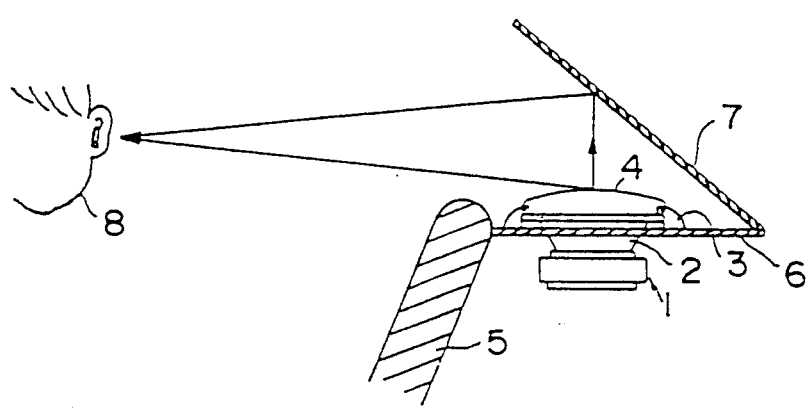
FIG. 10 shows a conventional speaker installed in an automobile.
Figure 11:
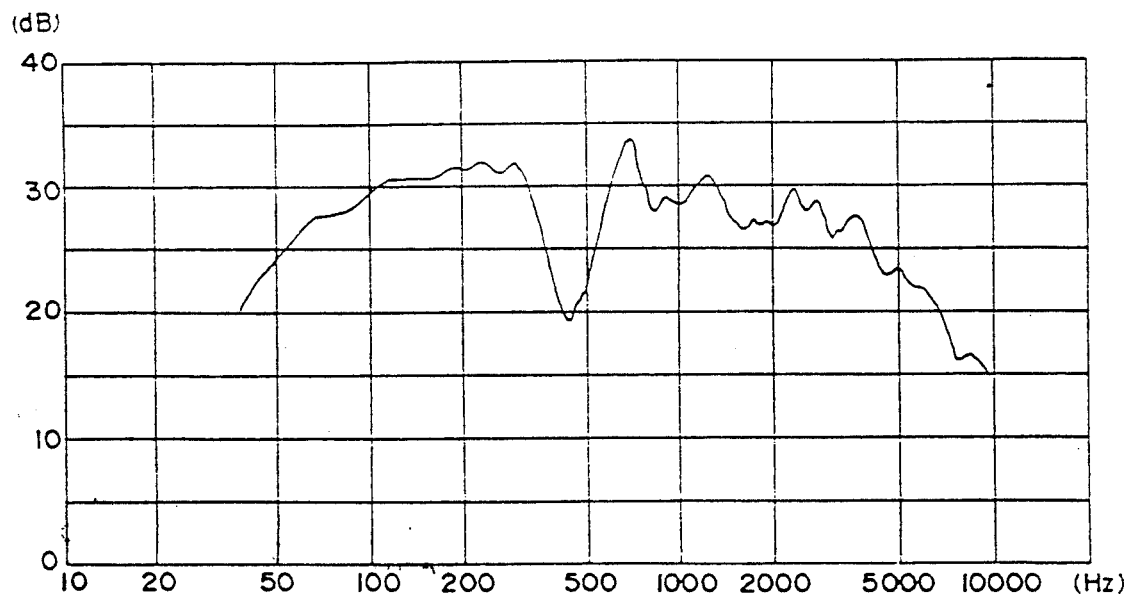
FIG. 11 is a graph showing the frequency response of the conventional speaker.

Referring to FIGS. 1 and 2, in a loudspeaker of the present invention, the magnetic circuit 1 and the speaker frame 2 are the same as in the conventional speaker shown in FIG. 10. The speaker frame 2 has a rectangular opening, around the periphery of which is mounted a grille 3a. A horizontal slit 3e is formed in the grille 3a on three sides thereof except a rear side adjacent to a rear window of an automobiles as shown in FIG. 2. The loudspeaker is mounted on the rear tray 6, setting the axis thereof vertically. Hence the sound is horizontally radiated in the three directions passing through the slit 3e.

Figure 3:
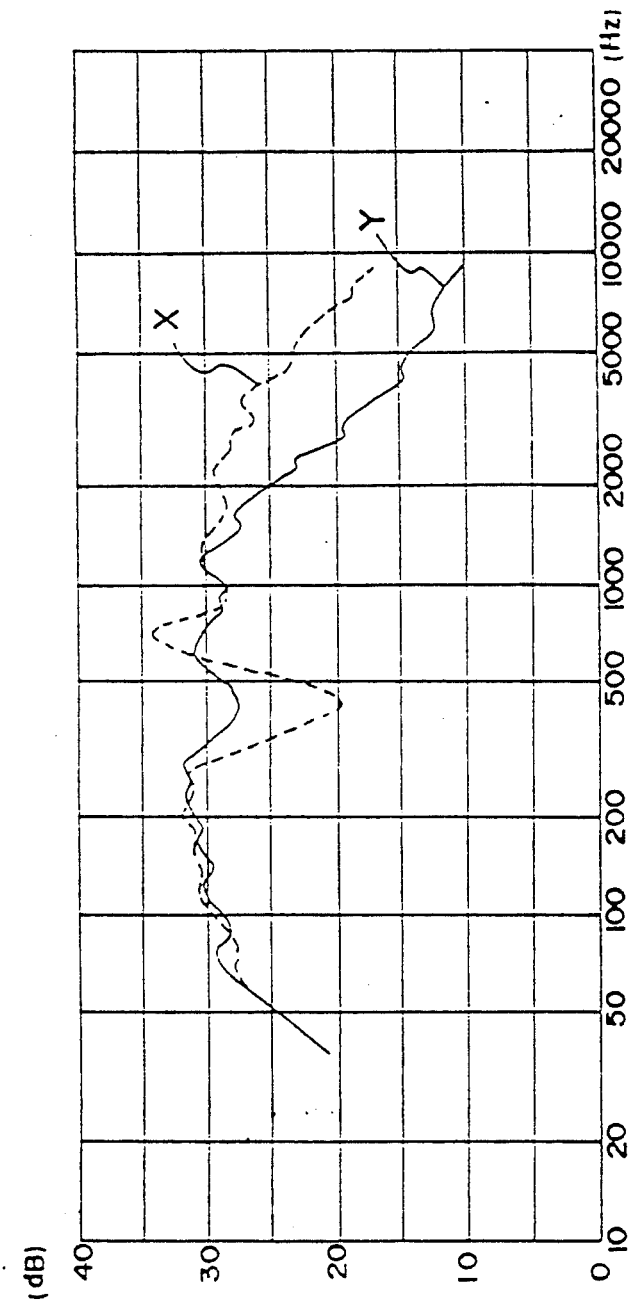
FIG. 3 is a graph showing the frequency response of the speaker of FIG. 1.

The frequency response of the speaker is shown by a line Y in the graph of FIG. 3. Compared with the frequency response of a conventional speaker shown by a dotted line X, a dip is significantly reduced, particularly in the frequencies adjacent 500 Hz. The cause of the improvement is that the sound reflected by a glass of the rear window is reduced in the present invention. Thus the sound can be clearly reproduced.

Figure 4:
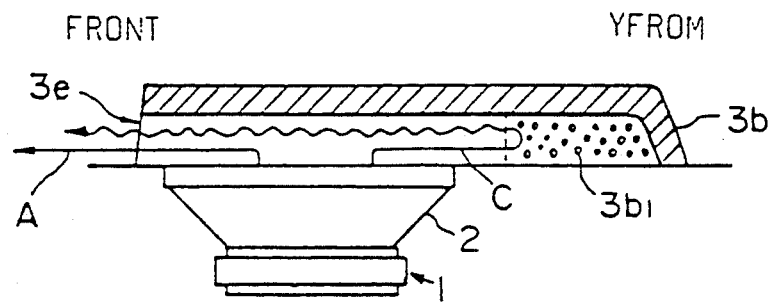
FIG. 4 is a sectional view of the loudspeaker as a second embodiment of the present invention.

FIG. 4 shows the second embodiment of the present invention having a grille 3b formed with the slit 3e only at the front side of the speaker. In the embodiment, a sound absorbent 3b1 such as a piece of sponge, is disposed in the grille 3b at a side adjacent the rear window. The absorbent 3b1 is preferably made of a material which absorbs the sound in the middle frequency range. Therefore, reflected sound C inside the grille 3b is absorbed by the absorbent 3b1 so as to reduce interference thereof with direct sound A.

Figure 5:
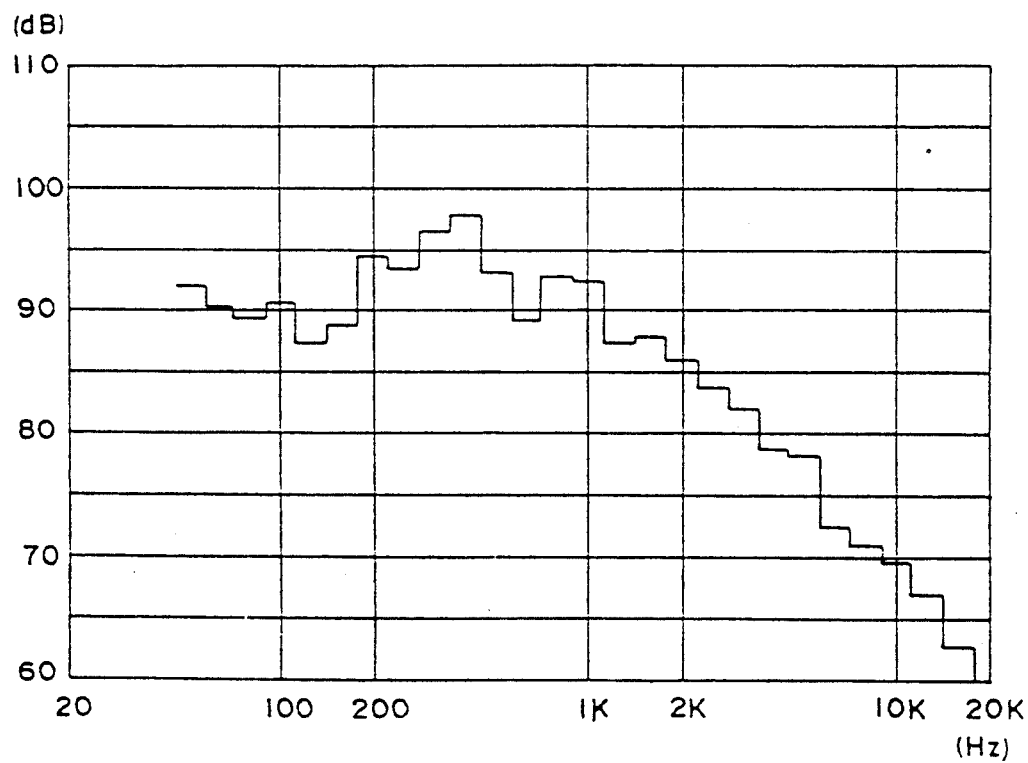
FIG. 5 is graph showing the frequency response of the speaker of FIG. 4.

It is evident from the frequency response of the speaker of the second embodiment shown in FIG. 5 that a peak in the middle frequency range is reduced.

Figure 6:
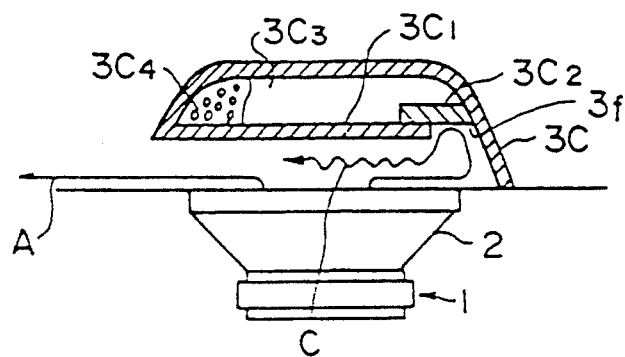
FIG. 6 is a sectional view of a speaker as a third embodiment of the present invention.

Referring to FIG. 6, the speaker of the third embodiment of the present invention has a grille 3c similar to the grille 3b in the first embodiment for covering the opening of the speaker frame 2. The inner space in the grille 3c is divided into two by a horizontal panel 3c1 and a sponge sound absorbent 3c2 provided to close an opening 3f formed in the panel 3c1. A sound absorbent 3c4, for example glass wool, is disposed in an upper chamber 3c3 formed by the panel 3c1, so that the upper chamber acts as a Helmholtz resonator.

Figure 7:
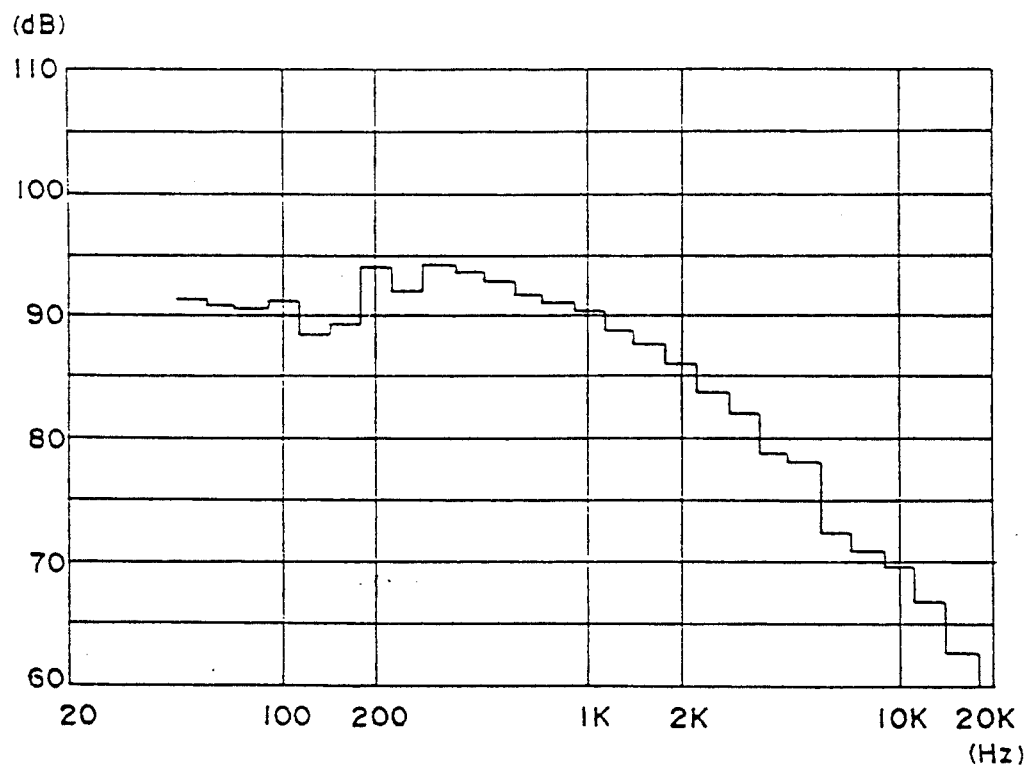
FIG. 7 is a graph showing the frequency response of the speaker of FIG. 6.

In operation, the reflected sound C inside the grille 3c is attenuated by the resonating function of the upper chamber 3c3. Hence the interference of the reflected sound C with the direct sound A is suppressed. As a result, as shown in FIG. 7, the peak in the frequency response is further reduced than in the previous embodiment.

Figure 8:
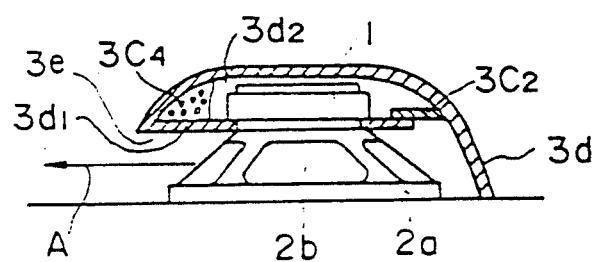
FIG. 8 is a sectional view of a speaker as a fourth embodiment of the present invention.

A speaker of the fourth embodiment shown in FIG. 8 has an inverted construction. Namely, a speaker frame 2a is mounted on the rear tray 6 of the automobile and the magnetic circuit 1 is positioned on the top of the speaker frame. A grille 3d having the slit 3e is mounted on the rear tray 6, thereby covering the speaker frame 2a and the magnetic circuit 1. In the periphery of the speaker frame 2a, a plurality of opening 2b are formed through which the direct sound A propagates. A horizontal panel 3d1 and the absorbent 3c2 are provided in the grille 3d, thus defining an upper chamber 3d2 wherein the magnetic circuit 1 is positioned. The sound absorbent 3c4 is disposed in the chamber 3d2 in the same manner as in the third embodiment. Hence the chamber 3d2 serves as a sound matching chamber having the function of the Helmholtz resonator.

The direct sound A is propagated passing through the openings 2b of the speaker frame 2a, so that the reflected sound generated inside the grille 3d is more reduced than the speaker shown in FIG. 6. In addition, the chamber 3d2 serves to attenuate the reflected sound thereby significantly reducing the interference of the sound waves with the direct sound A.

Figure 9:
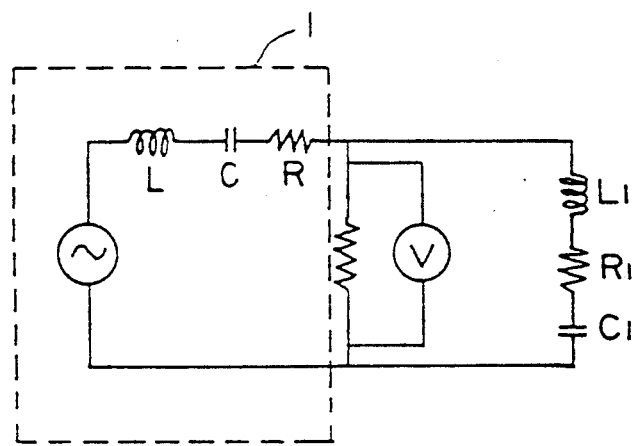
FIG. 9 shows an equivalent circuit of a rectifying chamber provided in the speaker shown in FIG. 8.

FIG. 9 shows an equivalent circuit which approximately equals the sound matching chamber. An inductance L1, resistance R1 and capacitance C1 represent various parameters determining the matching characteristics of the chamber 3d2. Thus by adjusting the parameters, the quality of sound can be easily improved.

In accordance with the present invention, the sound is restrained from propagating towards the rear window. Hence the sound reflected against the glass of the rear window is decreased, thereby reducing the disturbance of the frequencies in the order of 500 Hz which is caused by a dip in the frequency response. Consequently, a clear sound is reproduced.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A loudspeaker having a magnetic circuit and a speaker frame attached to the magnetic circuit, the loudspeaker being mounted on a rear tray of an automobile such that an axis of the loudspeaker is positioned vertically, the loudspeaker comprising:
   a grille attached to the speaker frame so as to reflect sound generated from the magnetic circuit,
   the grille including a rear inclined portion formed so as to reflect the sound in a forward horizontal direction, a horizontal guide portion for guiding the sound in the forward horizontal direction, and a slit defined in at least a front portion of said grille so as to radiate the sound in a forward horizontal direction;
   a sound absorbent formed in an interior of said grille so as to absorb sound propagating in a rearward direction; and
   a horizontal panel positioned in the interior of said grille so as to define an upper chamber between said horizontal panel and the horizontal guide portion of said grille, said sound absorbent being formed in the upper chamber.

2. A loudspeaker having a magnetic circuit and a speaker frame attached to the magnetic circuit, the loudspeaker being mounted on a rear tray of an automobile such that an axis of the loudspeaker is positioned vertically, the loudspeaker comprising:
   a grille having a horizontal top surface, a vertical front surface, a vertical rear surface, a vertical right surface and a vertical left surface, said grille being fixedly mounted over the loudspeaker on the rear tray so as to guide sound generated from the magnetic circuit in a forward horizontal direction;
   a slit defined on the front, right and left vertical surfaces of the grille so as to radiate the sound in a forward horizontal direction;
   a sound absorbent formed in an interior of said grille and positioned so as to absorb sound propagating not in the forward horizontal direction; and
   a horizontal panel positioned in the interior of said grille so as to define an upper chamber between said horizontal panel and the top horizontal surface of said grille, said sound absorbent being formed in the upper chamber.

3. The loudspeaker according to claim 2, wherein the loudspeaker is positioned on the rear tray such that the magnetic circuit is positioned in an interior of the upper chamber, and the speaker frame is located between said horizontal panel and the rear tray, the speaker frame having defined thereon a plurality of openings on an outer surface thereof.

* * * * *